US011383468B2

(12) United States Patent
Juvekar et al.

(10) Patent No.: US 11,383,468 B2
(45) Date of Patent: Jul. 12, 2022

(54) THERMALLY STABLE TIRE SEALANT

(71) Applicant: Indian Institute of Technology Bombay, Mumbai (IN)

(72) Inventors: Vinaykumar Anant Juvekar, Mumbai (IN); Mahesh S. Tirumkudulu, Mumbai (IN); Jyoti R. Seth, Mumbai (IN); Shruti S. Vaze, Bardez (IN)

(73) Assignee: Indian Institute of Technology Bombay, Mumbai (IN)

( * ) Notice: Subject to any disclaimer, the term of this patent is extended or adjusted under 35 U.S.C. 154(b) by 212 days.

(21) Appl. No.: 16/492,364

(22) PCT Filed: Mar. 8, 2018

(86) PCT No.: PCT/IB2018/051512
§ 371 (c)(1),
(2) Date: Sep. 9, 2019

(87) PCT Pub. No.: WO2018/163097
PCT Pub. Date: Sep. 13, 2018

(65) Prior Publication Data
US 2021/0129471 A1  May 6, 2021

(30) Foreign Application Priority Data
Mar. 9, 2017  (IN) .............................. 201721008259

(51) Int. Cl.
| B29D 30/06 | (2006.01) |
| B29C 73/16 | (2006.01) |
| C08K 3/40 | (2006.01) |
| C08K 7/28 | (2006.01) |
| B29K 483/00 | (2006.01) |
| B29K 509/08 | (2006.01) |

(52) U.S. Cl.
CPC ........ B29D 30/0685 (2013.01); B29C 73/163 (2013.01); C08K 3/40 (2013.01); C08K 7/28 (2013.01); *B29D 2030/0697* (2013.01); *B29D 2030/0698* (2013.01); *B29K 2483/00* (2013.01); *B29K 2509/08* (2013.01)

(58) Field of Classification Search
CPC .... B29D 30/0685; B29C 73/163; C08K 3/40; C08K 7/28; B29K 2483/00
See application file for complete search history.

(56) References Cited

U.S. PATENT DOCUMENTS

| 4,309,334 A | 1/1982 | Valitsky |
| 4,444,219 A | 4/1984 | Hohenstein |
| 4,713,114 A | 12/1987 | Smith |
| 4,959,217 A | 9/1990 | Sanders et al. |
| 5,364,463 A | 11/1994 | Huh |
| 5,772,747 A | 6/1998 | Turner et al. |
| 7,388,041 B2 | 6/2008 | Cegelski et al. |
| 7,807,732 B2 | 10/2010 | Fogal, Sr. |
| 8,316,903 B2 | 11/2012 | Majumdar et al. |
| 8,821,982 B2 | 9/2014 | Sostmann et al. |
| 9,067,369 B2 | 6/2015 | Takahara |
| 2005/0277712 A1 | 12/2005 | Daly |
| 2008/0039792 A1 | 2/2008 | Meng et al. |
| 2014/0221535 A1 | 8/2014 | Chan et al. |
| 2015/0231838 A1 | 8/2015 | Ragan et al. |
| 2016/0002468 A1 | 1/2016 | Heikkila et al. |

FOREIGN PATENT DOCUMENTS

| EP | 1270188 A1 | 2/2003 |
| WO | 2009/013038 A1 | 1/2009 |
| WO | 2013/053808 A1 | 4/2013 |

OTHER PUBLICATIONS

PCT Search Report dated Jul. 19, 2018, Application No. PCT/IB18/51512.
PCT Written Opinion dated Jul. 19, 2018, Application No. PCT/IB18/51512.

*Primary Examiner* — Edward J Cain
(74) *Attorney, Agent, or Firm* — The Dobrusin Law Firm, PC

(57) ABSTRACT

A tire sealant composition for use in tubeless tires is disclosed. The tire sealant composition primarily serves to seal the tire around the wheel rim and particularly in the tread area of the tire against punctures. The composition includes polymeric material, carrier fluid and particulate system. The tire sealant composition is flowable, non-toxic, non-corrosive and thermally stable.

13 Claims, No Drawings

THERMALLY STABLE TIRE SEALANT

FIELD OF THE INVENTION

The subject matter of the present invention, in general, relates to tire sealant compositions and particularly, pertains to a thermally stable anti-puncture sealant for use in tubeless tires in the tread area.

BACKGROUND ART

Tubeless tires are pneumatic tires that do not require a separate inner tube. Unlike pneumatic tires, which use a separate inner tube, tubeless tires have continuous ribs moulded integrally into the bead of the tire so that they are forced by the pressure of the air inside the tire to seal with the flanges of the metal rim of the wheel. A tire sealant is usually a liquid that may be injected into tires to prevent deflation in case of small punctures. A sealant has three basic functions: It fills a gap between two or more substrates, it forms a barrier through the physical properties of the sealant itself and by adhesion to the substrate, and, it maintains sealing properties for the expected lifetime, service conditions, and environments.

A sealant may be viscous material that has little or no flow characteristics and which stay where they are applied or they can be thin and runny so as to allow it to penetrate the substrate by means of capillary action. Various compounds have been used for sealing and balancing tires to prevent loss of air pressure because of punctures or small leaks, and to balance tires unbalanced by uneven tire wear. The available sealants usually lost their effectiveness after a short period of time due to interaction between the components of the composition, evaporation of some of the ingredients or balling up, loss of ability to flow etc., thereby rendering them insufficient.

Tire sealants have long been used in inflatable tires and are usually intended for temporary repairs in emergency situations when a puncture in the form of a hole or a crack occurs in an inflated tire. Typically, tire sealants are introduced through the valve of the tire and seal the hole or the tear provisionally until the tire can be replaced. The existing tire sealants can be divided into different categories.

The first category forms an immobile/semi-solid layer of sealant on the inner surface of the tyre although the layer is sufficiently soft in consistency to flow into a puncture hole under air pressure to seal the puncture.

The second category includes tire sealants that dry or form a gel on filling the puncture hole. These sealants are introduced into the tyre after the puncture has occurred. The gel formation is very rapid due to which the sealant has a short lifetime. A major disadvantage of the rapid gel formation is the possibility of clogging the valve while introducing the sealant into the tyre.

A third type of tire sealants, known as mobile tire sealants, consists of fibrous and/or particulate constituents in a carrier liquid. Upon rotation of the tire, the suspension of fibres and particles are distributed by the centrifugal force on the inner surface of the tire. In the event of a puncture, a combination of high air pressure and the centrifugal force push the suspension into the hole. The particulate matter and the fibrous constituents collect inside the puncture to plug the hole.

Reference is made to U.S. Pat. No. 4,713,114 B2, wherein a tire sealing and balancing composition comprising ethylene glycol, water, sodium dichromate, wetting agents, washed mica, short fiber asbestos, long fiber asbestos, and cellulosic thickener/filler is disclosed. The said sealant maintains sufficient fluidity at all times and at normally encountered temperatures such that automatic balancing occurs upon wearing of the tire.

Further reference is made to U.S. Pat. No. 8,316,903 B2, wherein a pneumatic tire having a built-in sealant layer is disclosed. The pneumatic tire includes an outer circumferential rubber tread and a supporting carcass with an optional rubber inner liner is disposed inwardly from the supporting carcass such that the built-in sealant layer is disposed inwardly from the rubber inner liner where it provides self-sealing properties to the pneumatic tire. A gas permeable layer is situated adjacent to an innermost rubber inner liner and the built-in sealant layer. The innermost rubber inner liner has a plurality of spaced apart openings extending therethrough that are covered by the gas permeable layer. The tire, with its innermost inner liner with holes and the gas permeable layer, allows for elimination or reduction.

Further reference is made to U.S. Pat. No. 5,364,463 B2, wherein an improved tire sealant containing a hydratable salt and clay such as barium sulfate and sodium bentonite and a substantial portion of a plate like mineral such as mica is disclosed. It offers improved suspendability and sealing performance due to presence of an alkylene glycol antifreeze such as propylene glycol is provided by an anionic thickening agent such as carboxymethylcellulose and mica flakes having an amount of both large and very fine sized particles Further reference is made to U.S. Pat. No. 5,772,747 B2, wherein a sealant composition especially useful for stopping punctures in vehicle tires is disclosed. It comprises (a) a viscous fluid such as propylene glycol or polypropylene glycol; (b) one or more fibrous materials such as cellulose, wool, nylon, rayon, hair, wollastonite, rock-wool, glass wool fibers, polyester, polypropylene, or other material of like nature; and (c) flat plate-like particles, such as mica. The composition is too viscous to be readily passed through a pneumatic tire valve stem, so the viscous product is installed into the tire while the tire is dismounted from the wheel. The composition is made of two parts, each of which is sufficiently low in viscosity to pass readily through the valve stem, but react on mixing inside the tire form a liquid of higher viscosity.

Further reference is made to U.S. Pat. No. 7,388,041 B2, wherein a puncture sealing agent for a tire is disclosed that has a rubber latex, an adhesive agent and an anti-freezing agent is disclosed wherein glycerin, potassium acetate or a solution of glycerin and potassium acetate is used as the anti-freezing agent.

Further reference is made to U.S. Pat. No. 7,807,732 B2, wherein a tire sealant composition for use in pneumatic tires is disclosed. The composition comprises a naturally derived viscous carrier fluid and at least one fibrous material, polymeric material or combination of both, wherein the composition remains fluid in use. The naturally derived viscous carrier fluid is preferably desugared molasses that is able to sustain a temperature of −30° F. (−34.4° C. and below) without freezing. This tire sealant composition is fire-retardant, non-toxic, non-corrosive and non-abrasive and is environmentally friendly.

Further reference is made to U.S. Pat. No. 8,821,982 B2, wherein a method for the production of a tire sealant with a polymeric base is disclosed. A highly viscous first sealant component including a natural rubber component that is undiluted or diluted with at least one additional natural rubber component and mixture ingredients that are free of a solvent and an activator) is mixed with at least one second sealant component comprising a separately produced medium with low viscosity containing at least one activator, to combine to the tire sealant wherein a cross linking occurs associated with the subsequent application of the tire sealant to the inside of the tire.

Further reference is made to US 2005/0277712 A1, wherein a tire sealant comprising a liquid carrier and a solid particulate is disclosed. The liquid carrier includes a by-product produced during the processing of an agricultural crop or product.

Further reference is made to US 2014/0221535 A1, wherein a tire sealant and a preparation method thereof is disclosed. The tire sealant comprises a solvent of 35%-95%, PVA gel of 0.05%-10%, block particles of 0.01%-5% and an additive of 0.1%-10%. The tire sealant may also comprise chitosan gel of 0.01%-5%. Using this tire sealant, a puncture formed by a spike with a diameter equal to or less than 6.35 mm may be sealed. Besides, the broken hole may be repaired between −40° C. and 70° C., and the sealing time may last for more than 48 hours.

Further reference is made to EP 1270188 A1, wherein a tyre sealant composition comprising an adhesive that includes polyvinyl acetate, a blocking agent that includes surface activated rubber particles, water and a dispersion agent comprising an electrostatic charged material is disclosed. The dispersion agent ensures an even distribution of the sealant composition on an inner surface of the tyre. Driving the vehicle coats an interior of the tyre with the composition and when a nail pierces the tyre wall, the sealant will seal around the object and when the object is removed the composition flows into the puncture hole under the action of air pressure within the tyre to fill and seal the hole providing a permanent repair of the hole.

Further reference is made to U.S. Pat. No. 9,067,369 B2, wherein a tire puncture sealant whereby both sealing performance and storage performance may be achieved is disclosed. The tire puncture sealant includes a natural rubber latex, an anti-freezing agent, and an acrylic emulsion where mass ratio of a solid content of the natural rubber latex to a solid content of the acrylic emulsion (natural rubber/acrylic resin) is from 50/50 to 15/85, amount of anti-freezing agent is from 100 to 300 parts by mass per 100 parts by mass of a total of the solid content of the natural rubber latex and the solid content of the acrylic emulsion, and total of the solid content of the natural rubber latex and the solid content of the acrylic emulsion is from 20 to 40 mass % of a total mass of the tire puncture sealant.

Further reference is made to US 2015/0231838 A1, wherein a low viscosity, lightweight liquid that contains the right type and amount of particles/objects as well as the right adhesive to provide the plug needed to form a permanent plug/clot and seal any punctures/holes and/or leaks while using up to 75% less tire sealant in comparison to many prior art formulations is disclosed.

Further reference is made to WO 2009/013038 A1, wherein a sealant component who's sealing effect results from the structure thereof is disclosed. The filler is pressed against the tire inner wall by centrifugal force during travel and builds up in layers on and/or in and/or over the damaged site and/or puncture site. The tire sealant comprises of filler, dispersion agents and binding agents wherein the dispersion agent is preferably partly replaced by an antifreeze compound and other sealant components may be an anti-sedimentation agent, a stabilizer and an antifoaming agent.

Further reference is made to WO 2013/053808 A1, wherein a tyre sealant with a water content of less than 3 wt %, comprising 50 wt % or more, relative to the overall composition, of a polyhydric alcohol or several polyhydric alcohols, at least one dispersion agent, at least one tackifier, at least one inorganic filler, at least one polyolefin powder, factice and fibres is disclosed.

Conventional mobile tire sealants are based on latex dispersion with water as the main solvent phase. Overtime, these sealants dry and coagulate inside the tire to form a rubbery mass thereby limiting the duration of their useful life. The drying process is accelerated at high temperatures thereby further limiting their use at elevated temperatures. The formation of the rubbery mass at the location of the puncture or due to premature drying inside the tire often prevents permanent repair of the tire. In addition to the aforementioned drawbacks, most sealants have an unpleasant smell caused by the volatile components making them inconvenient for use.

The present invention discloses a tire sealant that can be easily introduced inside the tire via the nozzle without clogging it. It provides long term sealing in the event of a puncture, so that long distances can be covered without significant air loss as it is not based on the drying of a volatile solvent thereby ensuring efficacy of the sealant for long durations and over a wide temperature range.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An object of the present invention is to provide a thermally stable tire sealant.

Another object of the present invention is to provide a tire sealant that may be easily introduced inside the tire via a nozzle without clogging it.

Yet another object of the present invention is to provide long term sealing in the event of a puncture, so that long distances may be covered without significant air loss.

Yet another object of the present invention is that the sealing effect is not based on the drying of a volatile solvent thereby ensuring efficacy of the sealant for long durations and over a wide range of temperatures.

Accordingly, in one aspect of the present invention, a flowable sealant composition for lining the inner surface of a tire for puncture repair comprising a polymeric material, a particulate blocking agent, and carrier fluid is disclosed.

In another aspect, the blocking agent includes hollow glass microspheres of size range from 5-25 µm and glass beads of size 100 µm. Preferably, at least 50% of the blocking agent is formed by glass beads. Ideally the blocking agent includes between 60% to 80% glass beads, preferably about 75%.

In another aspect, the polymeric material used is cross-linked polydimethylsiloxane (PDMS) with different degrees of cross-linking. The PDMS samples with varying cross-linking density were prepared with the ratio of the elastomer base to the curing agent ranging from 20:1 to 50:1.

In another aspect, the composition does not contain any anti-freezing agent since the silicone oil and the cross-linked PDMS works well in the temperature range of −40° C. to 150° C. with the silicone oil having a viscosity of 1000 cP.

Briefly, there is provided a flowable sealant composition for lining the inner surface of a tire for puncture repair comprising a polymeric material, a particulate blocking agent, and carrier fluid where the blocking agent includes hollow glass microspheres and glass beads. The polymeric material used is cross-linked polydimethylsiloxane (PDMS) with different degrees of cross-linking. The composition does not contain any anti-freezing agent since the silicone oil and the cross-linked PDMS works well in the temperature range of −40° C. to 150° C.

Other aspects, advantages, and salient features of the invention will become apparent to those skilled in the art from the following detailed description, which, discloses exemplary embodiments of the invention.

DETAILED DESCRIPTION OF THE PRESENT INVENTION

The following description is provided to assist in a comprehensive understanding of exemplary embodiments of the invention. It includes various specific details to assist in that understanding but these are to be regarded as merely exemplary.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a", "an", and "the" include plural referents unless the context clearly dictates otherwise.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or component but does not preclude the presence or addition of one or more other features, integers, steps, components or groups thereof.

The subject invention lies in providing a thermally stable tire sealant.

In the present invention, a flowable sealant composition for lining the inner surface of a tire for puncture repair comprising a polymeric material, a particulate blocking agent and carrier fluid is disclosed. The blocking agent includes hollow glass microspheres and glass beads. The polymeric material used is cross-linked polydimethylsiloxane (PDMS) with different degrees of cross-linking. The composition does not contain any anti-freezing agent since the silicone oil and the cross-linked PDMS works well in the temperature range of −40° C. to 150° C.

In one implementation, a tire sealant that may be easily introduced inside the tire via a nozzle without clogging is provided for.

In one implementation, long term sealing in the event of a puncture is provided for so that long distances may be covered without significant air loss.

In one implementation, the sealing effect may not be based on the drying of a volatile solvent thereby ensuring efficacy of the sealant for long durations and over a wide range of temperatures.

In one implementation, a tire sealant composition for lining an inner surface of a tire comprising a polymeric material, a carrier fluid and particulate blocking agent is provided for.

In one implementation, the particulate blocking agent comprises of glass beads and glass microspheres where the glass microspheres are hollow are provided for.

In one implementation, the polymeric material is siloxane and preferably polydimethylsiloxane and its analogues is provided for.

In one implementation, the carrier fluid is preferably silicone oil whose viscosity is about 1000 cP is provided for.

In one implementation, the particulate blocking agent is at least about 5% of tire sealant composition is provided for.

In one implementation, at least about 50% of the particulate blocking agent may be glass beads are provided for.

In one implementation, the glass beads are preferably present in an amount from about 60% to about 80% of the particulate blocking agent is provided for.

In one implementation, the glass beads may ideally be about 75% of the particulate blocking agent is provided for.

In one implementation, the size of the glass beads may preferably be about 100 μm and the size of the hollow glass microspheres may preferably be from about 5 μm to about 25 μm is provided for.

In one implementation, the polymeric material is preferably in an amount from about 10% to about 30% by volume of the sealant is provided for.

In one implementation, the carrier fluid is preferably in an amount from about 60% to about 80% by volume of the sealant is provided for.

The tire sealant composition may be easily introduced inside the tire via a nozzle without clogging to ensure long term sealing in the event of a puncture, so that long distances may be covered without significant air loss. Moreover, as the sealing effect is not based on the drying of a volatile solvent, it ensures efficacy of the sealant for long durations and over a wide range of temperatures.

The present invention discloses a tire sealant composition for lining an inner surface of a tire. It comprises of a polymeric material, a carrier fluid and particulate blocking agent where the particulate blocking agent are glass beads and hollow glass microspheres, the polymeric material is siloxane and the carrier fluid is preferably silicone oil.

In particular, the particulate blocking agent is at least about 5% of tire sealant composition where at least 50% of the particulate blocking agent is glass beads. The glass beads are preferably present in an amount from about 60% to about 80% of the particulate blocking agent. In fact, the glass beads may ideally be about 75% of the particulate blocking agent. The size of the glass beads may preferably be about 100 μm and the size of the hollow glass microspheres may preferably be from about 5 μm to about 25 μm.

The polymeric material is present preferably in an amount from about 10% to about 30% by volume of the sealant. The siloxane should preferably be polydimethylsiloxane PDMS with different degrees of crosslinking.

The carrier fluid is present preferably in an amount from about 60% to about 80% by volume of the sealant. The viscosity of the silicone oil is about 1000 cP.

The tire sealant composition is formulated by mixing together the following components manually.

TABLE 1

Listing the components used in the tire sealant with their % by volume.

| Components | Percentage by volume |
| --- | --- |
| Blocking agent (Hollow glass microspheres) | 5 |
| Blocking agent (Glass beads) | 5 |
| Polymeric material (PDMS) | 22.5 |
| Carrier Fluid (Silicone oil) | 67.5 |

A small volume of the sealant (about 5 ml) was introduced into a specially designed high pressure cell, which was subsequently pressurised to 32 psi and left overnight to make sure there is no air leakage. The aforementioned pressure corresponds to the pressure inside a car tire. After ensuring that there was no significant leak in the cell, nails of diameters ranging from 3 mm to 9 mm were pierced into tire-end of the cell and immediately removed. The cell is left undisturbed for more than 24 hours to observe for pressure loss. The present invention may seal puncture holes up to a diameter of 8 mm.

The disclosed tire sealant composition uses non-toxic chemical to provide an effective and permanent puncture sealing composition. It will not dry out as it does not contain any volatile component and also not corrode the metallic rim of the wheel as it does not contain any oxidising agent or chemical groups.

Although a comparatively simple, nontoxic, non-volatile, noncorrosive, effective and permanent tire puncture sealing composition has been described in language specific to structural features and/or methods, it is to be understood that the embodiments disclosed in the above section are not necessarily limited to the specific features or methods or devices described. Rather, the specific features are disclosed as examples of implementations of a thermally stable tire sealant.

The invention claimed is:

1. A tire sealant composition for lining an inner surface of a tire comprising a polymeric material, a carrier fluid and particulate blocking agent, wherein
   the polymeric material is a polydimethylsiloxane and its analogues,
   the carrier fluid is silicone oil, and the particulate blocking agent comprises glass fibers, glass microspheres, glass beads and/or polystyrene beads.

2. The tire sealant composition as claimed in claim 1, wherein the glass microspheres are hollow.

3. The tire sealant composition as claimed in claim 1, wherein the particulate blocking agent may at least be about 5% by volume of tire sealant composition.

4. The tire sealant composition as claimed in claim 1, wherein at least about 50% by volume of the particulate blocking agent comprises of glass microspheres.

5. The tire sealant composition as claimed in claim 1, wherein the glass microspheres may preferably be in an amount from about 60% to about 80% by volume of the particulate blocking agent.

6. The tire sealant composition as claimed in claim 1, wherein the glass microspheres may ideally be in an amount of about 75% by volume of the particulate blocking agent.

7. The tire sealant composition as claimed in claim 1, wherein size of the glass microspheres may preferably be about 100 μm and size of the polystyrene beads may be preferably 300 μm.

8. The tire sealant composition as claimed in claim 1, wherein size of the hollow glass microspheres may preferably be from about 5 μm to about 25 μm.

9. The tire sealant composition as claimed in claim 1, wherein the polymeric material is in an amount from about 5% to about 30% by volume of the sealant.

10. The tire sealant composition as claimed in claim 1, wherein the carrier fluid may preferably be in an amount from about 60% to about 80% by volume of the sealant.

11. The tire sealant composition as claimed in claim 1, wherein viscosity of silicone oil is in the range of 5 cP to 1000 cP.

12. The tire sealant composition as claimed in claim 1, wherein the sealant may be flowable.

13. The tire sealant composition as claimed in claim 1, wherein the sealant is thermally stable.

* * * * *